(12) United States Patent
Nakajima

(10) Patent No.: US 10,562,118 B2
(45) Date of Patent: Feb. 18, 2020

(54) TAPERED PIPE THREAD-MACHINING SPIRAL TAP

(71) Applicant: OSG CORPORATION, Toyokawa-shi, Aichi (JP)

(72) Inventor: Takayuki Nakajima, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 0 days.

(21) Appl. No.: 15/773,226

(22) PCT Filed: Dec. 2, 2015

(86) PCT No.: PCT/JP2015/083933
§ 371 (c)(1),
(2) Date: May 3, 2018

(87) PCT Pub. No.: WO2017/094152
PCT Pub. Date: Jun. 8, 2017

(65) Prior Publication Data
US 2018/0318949 A1     Nov. 8, 2018

(51) Int. Cl.
*B23G 5/06*     (2006.01)

(52) U.S. Cl.
CPC .......... *B23G 5/06* (2013.01); *B23G 2200/30* (2013.01); *B23G 2200/48* (2013.01)

(58) Field of Classification Search
CPC ... B23G 5/06; B23G 2200/30; B23G 2200/48
See application file for complete search history.

(56) References Cited

U.S. PATENT DOCUMENTS

| 6,213,693 B1 | 4/2001 | Kato |
| 2004/0247406 A1 | 12/2004 | Malagnino et al. |
| 2006/0216125 A1 | 9/2006 | Glimpel et al. |

(Continued)

FOREIGN PATENT DOCUMENTS

| CN | 1836813 A | 9/2006 |
| CN | 2843705 Y | 12/2006 |

(Continued)

OTHER PUBLICATIONS

Translation of Mar. 21, 2018 Office Action issued in Taiwanese Patent Application No. 105136142.

(Continued)

*Primary Examiner* — Alan Snyder
(74) *Attorney, Agent, or Firm* — Oliff PLC

(57) ABSTRACT

A pipe-tapered-thread machining spiral tap includes a tapered thread portion that is circumferentially divided by flutes into a plurality of lands. Each of at least one of the lands has a cutting edge that extends along a corresponding one of the flutes. The flutes are made of a plurality of spiral flutes that are three, four or five spiral flutes each having a helix angle that is not smaller than 30° and smaller than 50°. A flute width ratio AG/(AG+AL) is 0.3-0.5, where AG represents a central angle which is subtended by each of the flutes and which is defined at a center corresponding to the rotation axis in a cross section that is perpendicular to the rotation axis, and AL represents a central angle which is subtended by each of the lands and which is defined at the center in the cross section.

7 Claims, 7 Drawing Sheets

(56) References Cited

U.S. PATENT DOCUMENTS

| | | |
|---|---|---|
| 2007/0014643 A1 | 1/2007 | Malagnino et al. |
| 2007/0207865 A1 | 9/2007 | Glimpel et al. |
| 2010/0260566 A1 | 10/2010 | Glimpel et al. |
| 2012/0003054 A1 | 1/2012 | Takagi et al. |
| 2012/0289350 A1 | 11/2012 | Floeter |
| 2013/0236260 A1* | 9/2013 | Henderer ............... B23G 5/06 408/222 |
| 2016/0059336 A1 | 3/2016 | Bohm |
| 2016/0089738 A1 | 3/2016 | Koide et al. |
| 2017/0189979 A1* | 7/2017 | Hachiuma ............... B23G 5/06 |

FOREIGN PATENT DOCUMENTS

| | | | |
|---|---|---|---|
| CN | 101032772 A | | 9/2007 |
| CN | 101896306 A | | 11/2010 |
| CN | 102438786 A | | 5/2012 |
| CN | 202367299 U | | 8/2012 |
| CN | 102773570 A | | 11/2012 |
| CN | 104936733 A | | 9/2015 |
| DE | 2331927 A1 | | 1/1975 |
| GB | 187535 A | * 10/1922 | ............... B23G 5/06 |
| GB | 187535 A | | 10/1922 |
| JP | S63-124426 U | | 8/1988 |
| JP | 3005741 U | | 1/1995 |
| JP | 10118844 A | * 5/1998 | |
| JP | H10-118844 A | | 5/1998 |
| JP | 2004-230551 A | | 8/2004 |
| JP | 2008-080424 A | | 4/2008 |
| JP | 2008-087077 A | | 4/2008 |
| TW | 429188 B | | 4/2001 |
| TW | 201501845 A | | 1/2015 |
| WO | 00/23219 A1 | | 4/2000 |
| WO | WO-2007083778 A1 | * 7/2007 | ............... B23G 5/06 |

OTHER PUBLICATIONS

Feb. 16, 2016 International Search Report issued in International Patent Application No. PCT/JP2015/083933.

Sep. 21, 2017 Office Action issued in Taiwanese Patent Application No. 105136142.

Mar. 4, 2019 Office Action issued in Chinese Patent Application No. 201580084304.3.

Nov. 1, 2019 Office Action issued in Chinese Patent Application No. 201580084304.3.

* cited by examiner

FIG. 4

| | NUMBER OF FLUTES | FLUTE HELIX ANGLE (DEGREE) | PER ONE FLUTE | | FLUTE WIDTH RATIO AG/(AG+AL) | OUTLINE OF RESULTS |
|---|---|---|---|---|---|---|
| | | | LAND CENTRAL ANGLE AL (DEGREE) | FLUTE CENTRAL ANGLE AG (DEGREE) | | |
| TEST SAMPLE 1 | 4 | 0 | 50 | 40 | 0.4 | IMMEDIATELY BROKEN (CUTTING CHIP CLOGGING) REVEALING THAT FLUTE TWIST IS NECESSARY |
| TEST SAMPLE 2 | 4 | 30 | 50 | 40 | 0.4 | ACCEPTABLE BUT SOME VARIATION. REVEALING THAT FLUTE HELIX ANGLE COULD BE STILL INCREASED |
| TEST SAMPLE 3 | 4 | 45 | 50 | 40 | 0.4 | ACCEPTABLE |
| TEST SAMPLE 5 | 4 | 40 | 50 | 40 | 0.4 | ACCEPTABLE |
| TEST SAMPLE 4 | 4 | 50 | 50 | 40 | 0.4 | CUTTING EDGES WERE CHIPPED. REVEALING THAT RIGIDITY IS INSUFFICIENT |
| CONVENTIONAL SAMPLE 1 | 4 | 40 | 40 | 50 | 0.6 | BROKEN UPON ROTATION DIRECTION CHANGE (CUTTING CHIPS COULD NOT BE SEPARATED WELL) |
| TEST SAMPLE 7 | 4 | 40 | 45 | 45 | 0.5 | ACCEPTABLE BUT NOISE BY BITTEN CUTTING CHIPS UPON ROTATION DIRECTION CHANGE |
| TEST SAMPLE 5 | 4 | 40 | 50 | 40 | 0.4 | ACCEPTABLE |
| TEST SAMPLE 8 | 4 | 40 | 60 | 30 | 0.3 | ACCEPTABLE BUT WITH SLIGHT CLOGGING |
| TEST SAMPLE 9 | 4 | 40 | 70 | 20 | 0.2 | CUTTING CHIPS BUNCH UP TOGETHER (CUTTING CHIP CLOGGING) |
| CONVENTIONAL SAMPLE 2 | 5 | 40 | 32 | 40 | 0.6 | CUTTING CHIPS BUNCH UP TOGETHER (CUTTING CHIP CLOGGING) |

TAPERED PIPE THREAD-MACHINING SPIRAL TAP

TECHNICAL FIELD

The present invention relates to a spiral tap for machining an internal thread as a pipe tapered thread, and more particularly is concerned with a technique for restraining occurrence of drawback called "tearing" in the machined internal thread and occurrence of breakage of the tool

BACKGROUND ART

There is known a pipe-tapered-thread machining tap for machining a pipe tapered internal thread in a pipe, a pipe adaptor, a fluid equipment or the like. In the pipe-tapered-thread machining tap, its complete thread portion as well as its chamfered portion is tapered for making the pipe tapered internal thread tapered, so that thread cutting is performed not only by the chamfered portion but also by the complete thread portion.

In the pipe-tapered-thread machining tap, the thread cutting performed by the complete thread portion is carried out not only by its crest but also by its root whereby larger cutting resistance is generated as compared with thread cutting performed by a chamfered portion in a straight thread machining tap. Thus, in the pipe-tapered-thread machining tap, tap breakage, chipping, wear and other problems could easily occur, resulting in problems such as insufficiencies of machining efficiency and tool durability.

On the other hand, there is proposed a pipe-tapered-thread machining tap in which a total of edge thickness angles is 125°-150° for preventing brakeage and chipping of the tap and also preventing cutting chip clogging so as to provide a high efficiency and a long tool life even where the tap is used for machining a high-hardness material. An example of such a pipe-tapered-thread machining tap is disclosed in Patent Document 1.

PRIOR ART DOCUMENT

Patent Documents

Patent Document 1: Japanese Registered Utility Model No. 3005741

DISCLOSURE OF THE INVENTION

Object to be Achieved by the Invention

However, in the pipe-tapered-thread machining tap as described above, an amount of cut by one cutting edge of the complete thread portion is so small as about 5 µm, for example, so that the cutting edges are rubbed on an inner circumferential surface of the machined internal thread, thereby causing an inconvenience that tearing as a phenomenon of surface roughening of the inner circumferential surface of the internal thread is caused, particularly, where the work material is stainless steel or low carbon steel such as rolled steel for general structure. Moreover, cutting chips are bitten into a gap between a back edge (that is opposed to the cutting edge) and the inner circumferential surface of the machined internal thread when the direction of rotation of the tap is inverted, whereby indentation mark of the cutting edge is formed in the inner circumferential surface of the machined internal thread when the rotation of the tap is stopped, so that the sealing performance could be reduced.

The present invention was made in view of the background discussed above. It is therefore an object of the present invention to provide a spiral tap for machining a pipe tapered thread, which is capable of restraining occurrence of the tearing and formation of the mark of the cutting edge in the machined internal thread upon stop of rotation of the tap.

Various studies made by the inventors of the present invention under the above-described situation revealed a fact that the rubbing and the formation of the mark of the cutting edge upon stop of rotation of the tap can be advantageously retrained by a construction in which flutes are spiral flutes each having a certain range of helix angle and a width of each land is larger than a width of each flute in contrary to common sense in a conventional spiral tap for machining a pipe tapered thread. The present invention was made based on the revealed fact.

Measures for Achieving the Object

The essence of the first invention is, in (a) a spiral tap that is to be rotated about a rotation axis for machining a pipe tapered thread, the spiral tap comprising a tapered thread portion having a thread profile that becomes from an incomplete profile to a complete profile in a direction away from a distal end of a chamfered portion toward a complete thread portion, the tapered thread portion being circumferentially divided by flutes into a plurality of lands, each of the lands having a cutting edge that is defined by one of opposite ends of the each of the lands which is located on a front side of the other of the opposite ends in a direction of rotation of the spiral tap, such that the cutting edge extends along a corresponding one of the flutes, that (b) the flutes consist of a plurality of spiral flutes that are three, four or five spiral flutes each having a helix angle that is not smaller than 30° and smaller than 50°, and that (c) a flute width ratio AG/(AG+AL) is 0.3-0.5, where AG represents a central angle which is subtended by each of the flutes and which is defined at a center corresponding to the rotation axis in a cross section that is perpendicular to the rotation axis, and AL represents a central angle which is subtended by each of the lands and which is defined at the center in the cross section.

The essence of the second invention is, in the first invention, that the spiral flutes consist of four spiral flutes and the lands consist of four lands defined by the four spiral flutes, and that the cutting edge is provided in every other of the four lands in a circumferential direction.

The essence of the third invention is, in the first or second invention, that the plurality of spiral flutes are right-hand spiral flutes.

The essence of the fourth invention is, in the first or second invention, that the plurality of spiral flutes are left-hand spiral flutes.

The essence of the fifth invention is, in any one of the first through fourth inventions, that each of the lands has a back edge that is defined by the other of the opposite ends of each of the lands which is located on a front side of the one of the opposite ends in a direction opposite to the direction of rotation of the spiral tap, such that the back edge extends along a corresponding one of the flutes, and that a rake angle of the back edge is smaller than a rake angle of the cutting edge.

The essence of the sixth invention is, in any one of the first through fifth inventions, that a relief angle is defined in the chamfered portion from the cutting edge to an intermediate position in a width of each of the lands, and the relief angle is zero from the intermediate position to the back edge.

The essence of the seventh invention is, in any one of the first through sixth inventions, that at least the chamfered portion and the complete thread portion are subjected to a surface treatment with a titanium carbonitride TiCN film.

Effect of the Invention

According to the first invention, in (a) a spiral tap that is to be rotated about a rotation axis for machining a pipe tapered thread, the spiral tap comprising a tapered thread portion having a thread profile that becomes from an incomplete profile to a complete profile in a direction away from a distal end of a chamfered portion toward a complete thread portion, the tapered thread portion being circumferentially divided by flutes into a plurality of lands, each of the lands having a cutting edge that is defined by one of opposite ends of the each of the lands which is located on a front side of the other of the opposite ends in a direction of rotation of the spiral tap, such that the cutting edge extends along a corresponding one of the flutes, that (b) the flutes consist of a plurality of spiral flutes that are three, four or five spiral flutes each having a helix angle that is not smaller than 30° and smaller than 50°, and that (c) a flute width ratio AG/(AG+AL) is 0.3-0.5, where AG represents a central angle which is subtended by each of the flutes and which is defined at a center corresponding to the rotation axis in a cross section that is perpendicular to the rotation axis, and AL represents a central angle which is subtended by each of the lands and which is defined at the center in the cross section. Thus, it is possible to obtain a pipe-tapered-thread machining spiral tap in which occurrence of tearing is restrained owing to presence of the spiral flutes each having the helix angle that is not smaller than 30° and smaller than 50°, and in which formation of mark of the cutting edge in the machined internal thread upon stop of rotation of the tap is retrained owing to a short distance between the cutting edge and a back edge.

According to the second invention, the spiral flutes consist of four spiral flutes and the lands consist of four lands defined by the four spiral flutes, and that the cutting edge is provided in every other of the four lands in a circumferential direction. Thus, a depth of cut by one cutting edge is made large whereby rubbing due to slip of the cutting edge is further restrained.

According to the third invention, the plurality of spiral flutes are right-hand spiral flutes, so that cutting chip clogging is restrained.

According to the fourth invention, the plurality of spiral flutes are left-hand spiral flutes, so that cutting chip clogging is retrained.

According to the fifth invention, each of the lands has a back edge that is defined by the other of the opposite ends of each of the lands which is located on a front side of the one of the opposite ends in a direction opposite to the direction of rotation of the spiral tap, such that the back edge extends along a corresponding one of the flutes, and that a rake angle of the back edge is smaller than a rake angle of the cutting edge. Thus, formation of mark of the cutting edge upon stop of rotation of the tap is further restrained.

According to the sixth invention, a relief angle is defined in the chamfered portion from the cutting edge to an intermediate position in a width of each of the lands, and the relief angle is zero from the intermediate position to the back edge. Thus, the back edge is retreated relative to the cutting edge by a small amount whereby formation of mark of the cutting edge upon stop of rotation of the tap is further restrained.

According to the seventh invention, at least the chamfered portion and the complete thread portion are subjected to a surface treatment with a titanium carbonitride TiCN film. Thus, the spiral tap has an increased durability.

Preferably, cemented carbide or high-speed tool steel is preferably used as the substrate that is to be covered with the titanium carbonitride TiCN film as a hard coating. However, any one of the other kinds of tool materials may be used as the substrate.

BRIEF DESCRIPTION OF DRAWINGS

FIG. 4 is a set of tables explaining results of tests conducted by the present inventor.

MODES FOR CARRYING OUT THE INVENTION

A pipe-tapered-thread machining spiral tap as an embodiment of the present invention will be described in detail with reference to the drawings.

Embodiment

Figure 1:
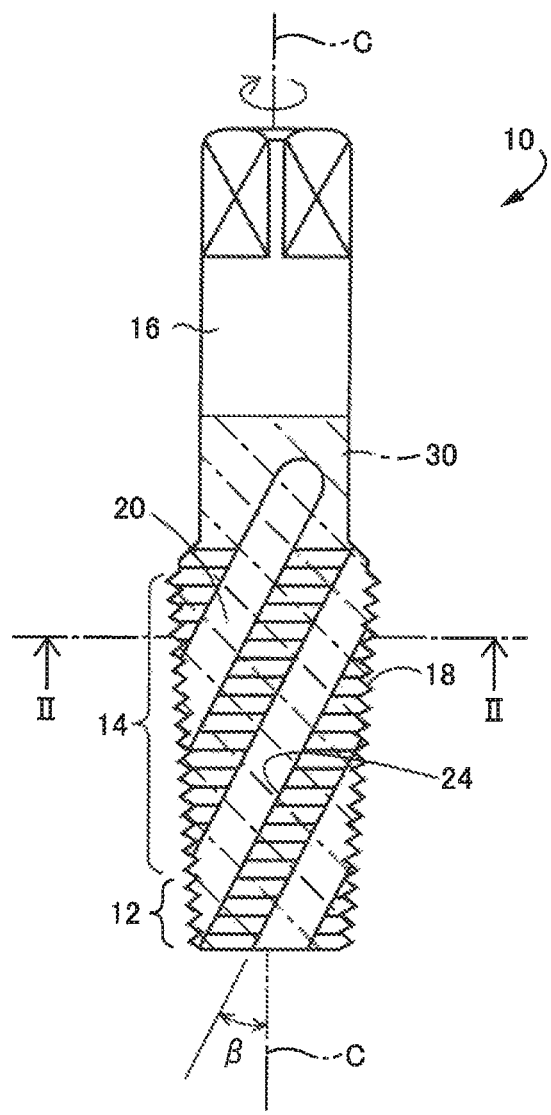
FIG. 1 is a front view showing a pipe-tapered-thread machining spiral tap according to an embodiment of the invention.
Figure 2:
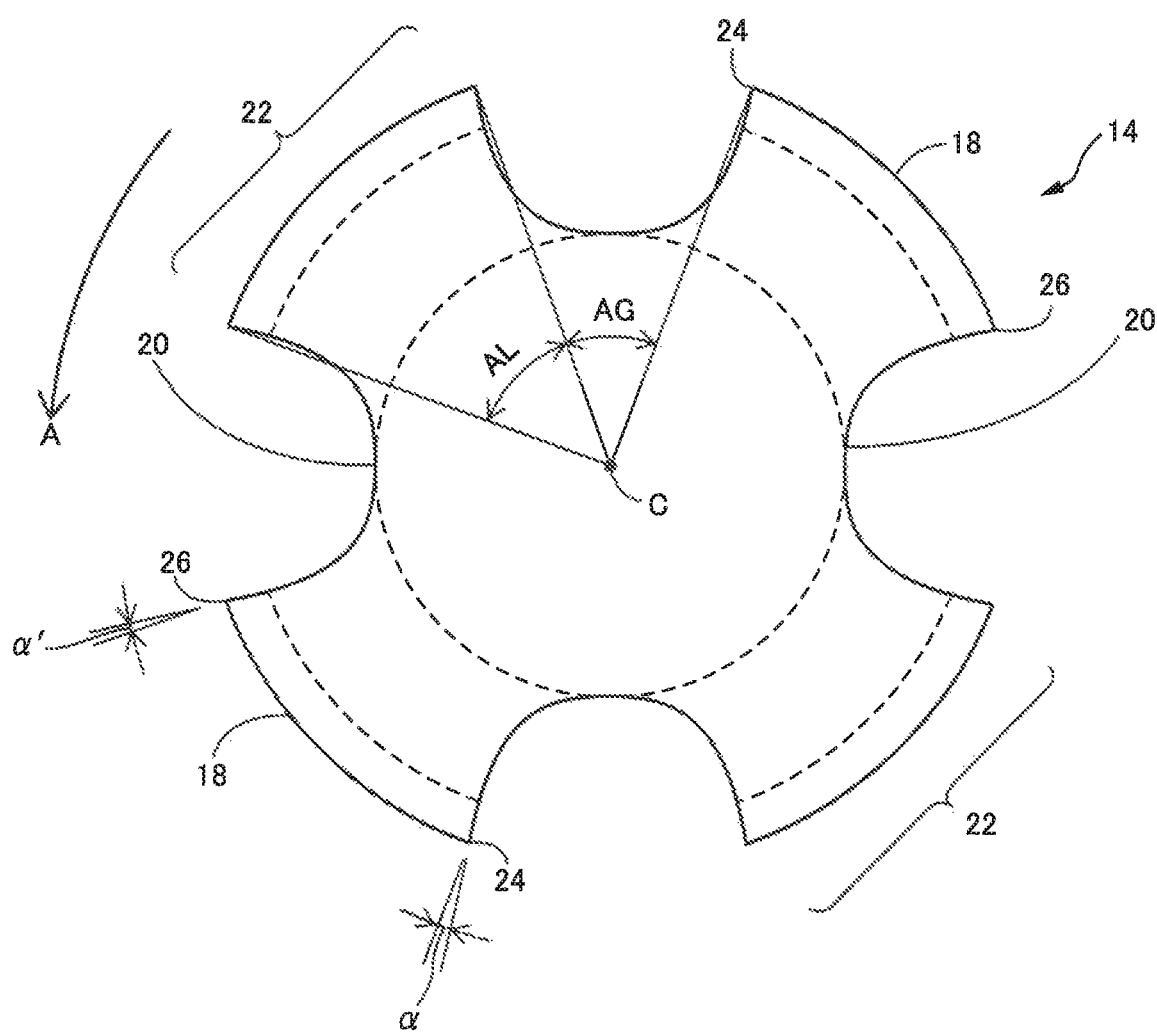
FIG. 2 is a cross sectional view taken along line II-II and explaining construction of the pipe-tapered-thread machining spiral tap of FIG. 1.
Figure 7:
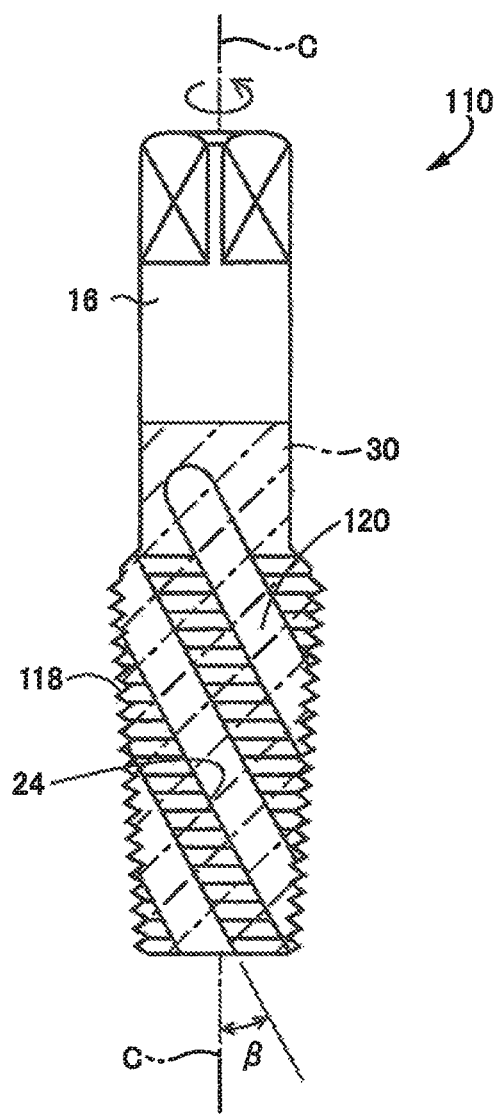
FIG. 7 is a front view showing a pipe-tapered-thread machining spiral tap according to an embodiment of the invention, which includes a tapered thread portion which defines a left-hand tapered thread and which is circumferentially divided by left-hand spiral flutes.

FIG. 1 is a front view showing a pipe-tapered-thread machining spiral tap 10 according to an embodiment of the invention. FIG. 2 is a view showing, in enlargement, a cross section taken along line II-II of FIG. 1. As shown in FIGS. 1 and 2, the pipe-tapered-thread machining spiral tap 10 has a chamfered portion 12, a complete thread portion 14 and a shank portion 16 that are arranged in this order as view in a direction away from its distal end, and is to be rotated about its rotation axis rotation axis C. A tapered thread portion 18, which is constituted by the chamfered portion 12 and the complete thread portion 14, has a thread profile that becomes from an incomplete profile to a complete profile in a direction away from a distal end of the chamfered portion 12 toward the complete thread portion 14. The tapered thread portion 18 is circumferentially divided by a plurality of spiral flutes 20 into a plurality of lands 22. Although each of the spiral flute 20 may be either a right-hand spiral flute or a left-hand spiral flute, it is the right-hand spiral flute in the present embodiment. It is noted that FIG. 7 shows another embodiment in the form of a pipe-tapered-thread machining spiral tap 110 including a tapered thread portion 118 which defines a left-hand tapered thread and which is circumferentially divided by left-hand spiral flutes 120.

Thus, a cutting edge 24 is defined by one of opposite ends of the land 22, which is located on a front side of the other of the opposite ends in a direction A of rotation of the tap 10, such that the cutting edge 24 extends along the spiral flute 20. Meanwhile, a back edge 26 is defined by the other of the opposite ends of the land 22, which is located on a front side of the above-described one of the opposite ends of the land 22 in a direction opposite to the rotation direction A, such that the back edge 26 extends along the right-hand spiral flute 20. The spiral flute 20 has a cross section whose shape is adapted such that a rake angle α of the cutting edge 24 is about four to ten times as large as a rake angle α' of the back edge 26.

The right-hand spiral flutes 20 function as flutes for storing or evacuating cutting chips, and consist of 3-5 flutes that are arranged with a constant interval between each adjacent two of the flutes 20 in a circumferential direction. Each of the spiral flutes 20 has substantially the same degree of bottom slope as the pipe tapered thread of the thread portion 18. In the present embodiment, the spiral flutes 20 consist of four flutes, so that the thread portion 18 in which the pipe tapered thread is provided is circumferentially divided by the four right-hand spiral flutes 20 whereby the four lands 22 are formed. A helix angle β of each spiral flute 20 is not smaller than 30° and smaller than 50°, preferably 35°-45°, and more preferably a value close to 40°. It is preferable that the cutting edge 24 is provided in every other of the four lands 22 in the circumferential direction.

FIG. 2 shows a cross section of the complete thread portion 14, which is perpendicular to the rotation axis C. As shown in FIG. 2 in detail, the cross sectional shape of each spiral flute 20 is adapted for satisfying a relationship AL>AG where "AG" represents a central angle AG which is subtended by each spiral flute 20 and which is defined at a center corresponding to the rotation axis C while "AL" which is subtended by each land 22 and which is defined at the center corresponding to the rotation axis C. More in detail, a flute width ratio, which is defined by AG/(AG+AL), is not smaller than 0.3 and is not larger than 0.5.

Figure 3:
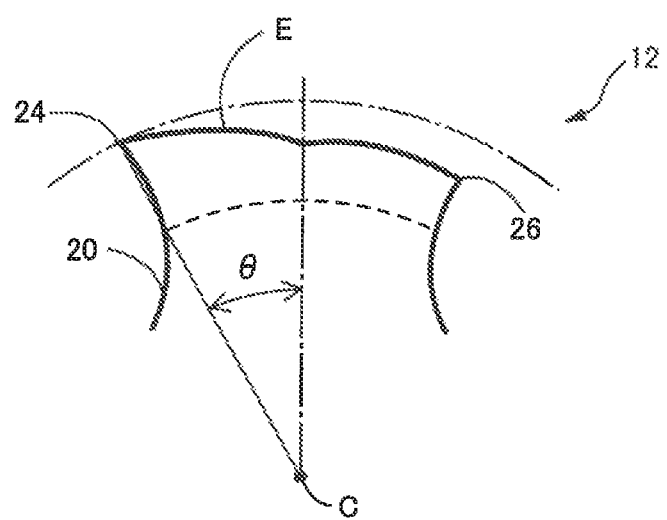
FIG. 3 is a cross sectional view of a major portion of a chamfered portion and explaining construction of the pipe-tapered-thread machining spiral tap of FIG. 1.
Figure 5:
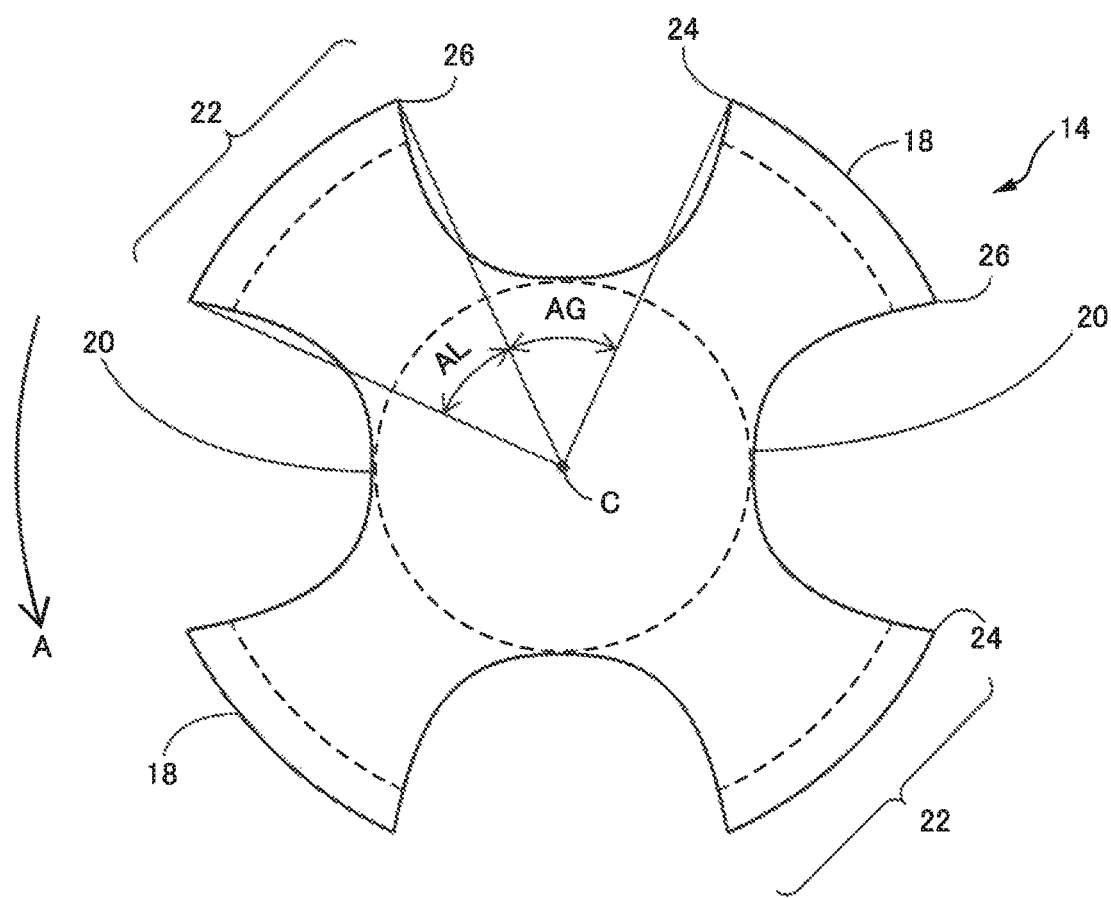
FIG. 5 is a cross sectional view of a pipe-tapered-thread machining spiral tap that is a conventional sample 1 shown in FIG. 4.
Figure 6:
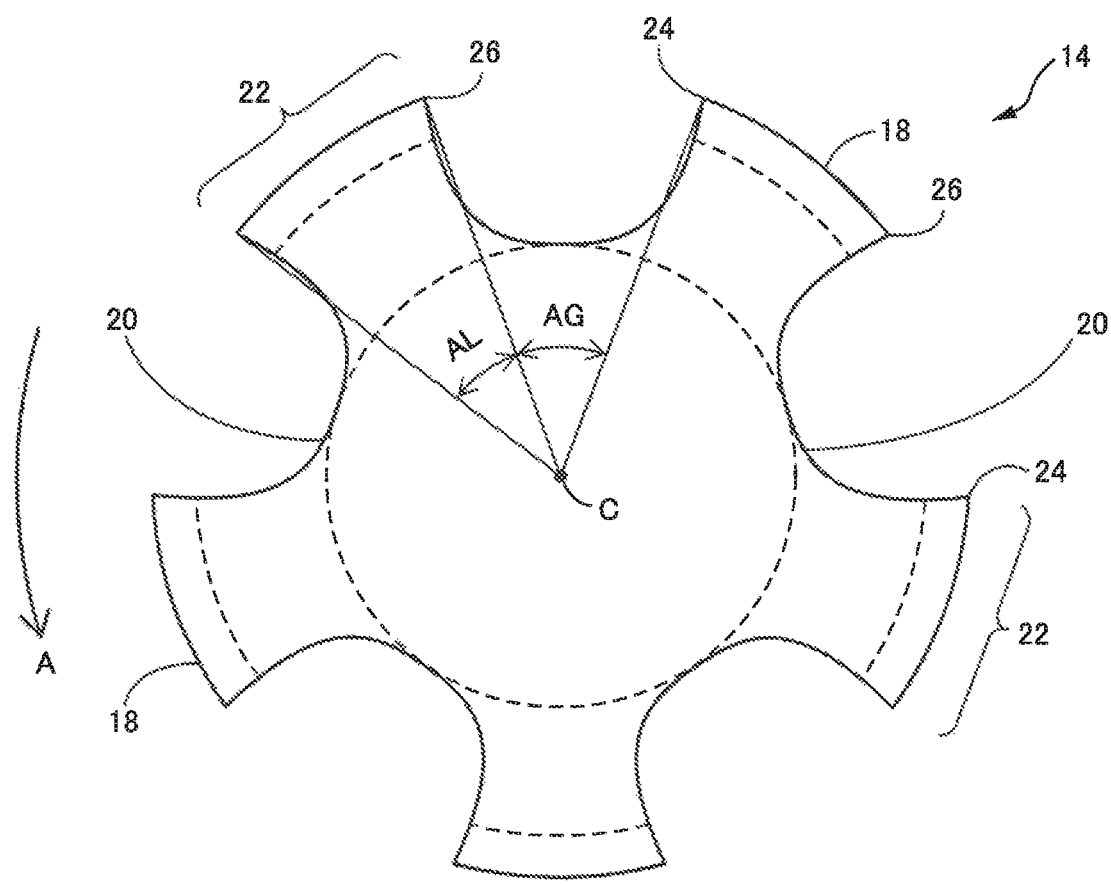
FIG. 6 is a cross sectional view of a pipe-tapered-thread machining spiral tap that is a conventional sample 2 shown in FIG. 4.

FIG. 3 shows, in enlargement, a cross section of the chamfered portion 12. As shown in FIG. 3, a relieved surface E is defined such that a radial distance from the rotation axis C to the relieved surface E is reduced in a direction opposite to the rotation direction in a region from the cutting edge 24 to an intermediate position in a width of the land 22 (blade thickness), namely, in a range from the cutting edge 24 over an angle θ, for example, 20°-23°, and such that the radial distance is constant in the direction opposite to the rotation direction, with a relief angle being zero, in a region from the intermediate position to a heel (back edge 26) of the land 22.

The pipe-tapered-thread machining spiral tap 10 is subjected, at at least the chamfered portion 12 and the complete thread portion 14, to a surface treatment, whereby a titanium carbonitride TiCN film 30, for example, is formed thereon.

The present inventor and his collaborators experimentally prepared various types of pipe-tapered-thread machining spiral taps, i.e., test samples 1-5, test samples 7-9 and conventional samples 1 and 2, which are the same as one another in terms of the material (high-speed tool steel), the surface treatment (titanium carbonitride TiCN), the type (Rc1/2) of tapered thread to be machined and the rake angle α (12°) of the cutting edge 24, and which are different from one another in terms of the number of the spiral flutes 20 and the central angle of the land 22. Then, they conducted cutting tests of machining a pipe tapered internal thread, by using the various types of test samples and conventional samples, under a condition specified below. FIG. 4 shows constructions of the test samples 1-5, test samples 7-9 and conventional samples 1 and 2, and results of the cutting tests.

(Cutting Tests Condition)
Workpiece material: SUS304
Used machine: Horizontal machining center (BT #50)
Cutting fluid: Water-soluble cutting fluid
Fluid application method: Application from outside of the tap
Cutting speed: 4 m/min.

In the test samples 1-5, the respective values of the helix angle β of the spiral flutes are 0°, 30°, 45°, 40° and 50°, and the flute width ratio AG/(AG+AL) is 0.4 that is common to the test samples 1-5. The flute width ratio AG/(AG+AL) is a value rounded to an integer. As is obvious from the results of the tests shown in FIG. 4, the tap was broken at an early stage due to cutting chip clogging in the test sample 1, and the cutting edges were chipped in the test sample 4. On the other hand, in each of the test sample 2, 3 and 5, a satisfactory result was obtained with the machined internal thread being acceptable in an inspection made by using a thread gauge, since tearing was not caused and occurrence of formation of mark of the cutting edge upon stop of rotation of the tap was retrained. These facts revealed that the tap was broken as a result of cutting chip clogging due to absence of twist of the flutes in the test sample 1, that the cutting edges were chipped due to insufficiency of the tool rigidity in spite of presence of twist of the flutes in the test sample 4, and that the cutting chip clogging and the chipping of the cutting edges were not caused where the helix angle β of the spiral flutes 20 is not smaller than 30° and smaller than 50°.

The conventional sample 1 and the test samples 5, 7, 8, 9 are the same as one another in that the number of the flutes is four and the flute helix angle β is 40° and are different from one another in terms of the flute width ratio AG/(AG+AL). Further, the conventional sample 2 is different from the conventional sample 1 in that the number of the flutes is five. In according to the tests results shown in FIG. 4, in the conventional sample 1, the cutting chips could not be separated from the machined internal thread, and the tool was broken upon change of the direction of the tool rotation. In the test sample 9 and the conventional sample 2, the cutting chips bunched up together and caused clogging. On the other hand, in each of the test samples 5, 7, 8, a satisfactory result was obtained with the machined internal thread being acceptable in an inspection made by using a thread gauge, since tearing was not caused and occurrence of formation of mark of the cutting edge upon stop of rotation of the tap was retrained. However, a noise was caused by the bitten cutting chips upon change of the direction of the tool rotation in the test sample 7 and slight cutting chip clogging was seen in the test sample 8. These facts revealed that the tap was broken as a result of cutting chip clogging due to absence of twist of the flutes in the test sample 1, that the cutting edges were chipped due to insufficiency of the tool rigidity in spite of presence of twist of the flutes in the test sample 4, and that the cutting chip clogging and the chipping of the cutting edges were not caused where the helix angle β of the spiral flutes 20 is not smaller than 30° and smaller than 50°. These facts revealed that the cutting chips could not be separated from the machined internal thread and caused clogging, due to the flute width ratio AG/(AG+AL) that is larger than 0.5 in each of the conventional samples 1 and 2, that the cutting chips bunched up together and caused clogging, due to the flute width ratio AG/(AG+AL) that is smaller than 0.3 in the test sample 9, and that the tap breakage due to the cutting chip clogging and the unseparation of the cutting chips was not caused where the flute width ratio AG/(AG+AL) is not smaller than 0.3 and is not larger than 0.5.

As described above, the pipe-tapered-thread machining spiral tap 10 according to the present embodiment is to be rotated about the rotation axis C for machining a pipe tapered thread, wherein the spiral tap 10 includes the tapered thread portion 18 having a thread profile that becomes from an incomplete profile to a complete profile in a direction away from a distal end of the chamfered portion 12 toward the complete thread portion 14. The tapered thread portion 18 is circumferentially divided by the spiral flutes 20 into the plurality of lands 22. The lands 22 has the cutting edge 24 that is defined by one of opposite ends of the land 22 which is located on a front side of the other of the opposite ends in the direction of rotation of the spiral tap 10, such that the cutting edge 24 extends along a corresponding one of the spiral flutes 20. The spiral flutes 20 consist of a plurality of spiral flutes 20 that are three, four or five spiral flutes each having a helix angle β that is not smaller than 30° and smaller than 50°. The flute width ratio AG/(AG+AL) is 0.3-0.5, where AG represents a central angle which is subtended by each spiral flute 20 and which is defined at a center corresponding to the rotation axis C in a cross section that is perpendicular to the rotation axis, and AL represents a central angle which is subtended by each land 22 and which is defined at the center in the cross section. Thus, it is possible to obtain the pipe-tapered-thread machining spiral tap 10 in which occurrence of tearing is restrained owing to presence of the spiral flutes 20 each having the helix angle β that is not smaller than 30° and smaller than 50°, and in which formation of mark of the cutting edge in the machined internal thread upon stop of rotation of the tap is retrained owing to a short distance between the cutting edge 24 and the back edge 26.

In the pipe-tapered-thread machining spiral tap 10 according to the present embodiment, the spiral flutes 20 consist of four spiral flutes 20 and the lands 22 consist of four lands 22 defined by the four spiral flutes 20, and that the cutting edge 24 is provided in every other of the four lands 22 in a circumferential direction. Thus, a depth of cut by one cutting edge is made large whereby rubbing due to slip of the cutting edge 24 is further restrained.

In the pipe-tapered-thread machining spiral tap 10 according to the present embodiment, the plurality of spiral flutes 20 are right-hand spiral flutes or left-hand spiral flutes, so that cutting chip clogging is restrained whereby breakage is further restrained.

In the pipe-tapered-thread machining spiral tap 10 according to the present embodiment, the land 22 has the back edge 26 that is defined by the other of the opposite ends of the land 22 which is located on a front side of the above-described one of the opposite ends in a direction opposite to the direction A of rotation of the spiral tap 10, such that the back edge 26 extends along a corresponding one of the spiral flutes 20, and that a rake angle β' of the back edge 26 is smaller than the rake angle β of the cutting edge 24. Thus, formation of mark of the cutting edge 24 upon stop of rotation of the tap is further restrained.

In the pipe-tapered-thread machining spiral tap 10 according to the present embodiment, the relief angle is defined in the chamfered portion 12 from the cutting edge 24 to an intermediate position in a width of the land 22, namely, in a range from the cutting edge 24 over an angle θ, and the relief angle is zero from the intermediate position to the back edge 26. Thus, the back edge 26 is retreated relative to the cutting edge 24 by a small amount whereby formation of mark of the cutting edge upon stop of rotation of the tap is further restrained.

In the pipe-tapered-thread machining spiral tap 10 according to the present embodiment, at least the chamfered portion 12 and the complete thread portion 14 are subjected to a surface treatment with the titanium carbonitride TiCN film 30, so that the spiral tap 10 has an increased durability.

While the embodiment of the present invention has been described by reference to the accompanying drawings, it is to be understood that the invention is applicable to other forms in a range without departing from the spirit of the invention.

DESCRIPTION OF REFERENCE SIGNS

10: pipe-tapered-thread machining spiral tap 12: chamfered portion 14: complete thread portion 16: shank portion 18: thread portion 20: spiral flute 22: land 24: cutting edge 26: back edge 30: titanium carbonitride film α: rake angle β: helix angle C: rotation axis

The invention claimed is:

1. A spiral tap that is to be rotated about a rotation axis for machining a pipe tapered thread, said spiral tap comprising a tapered thread portion having a thread profile that becomes from an incomplete profile to a complete profile in a direction away from a distal end of a chamfered portion toward a complete thread portion, said tapered thread portion being circumferentially divided by flutes into a plurality of lands, each of at least one of said lands having a cutting edge that is defined by one of opposite ends of said each of said at least one of said lands which is located on a front side of the other of said opposite ends in a direction of rotation of said spiral tap, such that said cutting edge extends along a corresponding one of said flutes, wherein
said flutes consist of a plurality of spiral flutes that are three, four or five spiral flutes each having a helix angle that is not smaller than 30° and smaller than 50°, and a flute width ratio AG/(AG+AL) is 0.3-0.5, where AG represents a central angle which is subtended by each of said flutes and which is defined at a center corresponding to said rotation axis in a cross section that is perpendicular to said rotation axis, and AL represents a central angle which is subtended by each of said lands and which is defined at said center in said cross section.

2. The spiral tap according to claim 1, wherein
said spiral flutes consist of four spiral flutes and said lands consist of four lands defined by said four spiral flutes, and
said cutting edge is provided in every other of said four lands as said at least one of said lands in a circumferential direction of said spiral tap.

3. The spiral tap according to claim 1, wherein
said tapered thread portion defines a right-hand tapered thread, and
said plurality of spiral flutes are right-hand spiral flutes.

4. The spiral tap according to claim 1, wherein
said tapered thread portion defines a left-hand tapered thread, and
said plurality of spiral flutes are left-hand spiral flutes.

5. The spiral tap according to claim 1, wherein
each of said at least one of said lands has a back edge that is defined by said other of said opposite ends of each of said at least one of said lands which is located on a front side of said one of said opposite ends in a direction opposite to said direction of rotation of said spiral tap, such that said back edge extends along a corresponding one of said flutes; and a rake angle of said back edge is smaller than a rake angle of said cutting edge.

6. The spiral tap according to claim 5, wherein a relieved surface is defined in said chamfered portion, such that a radial distance from said rotation axis to said relieved surface is reduced in a direction opposite to said direction of rotation of said spiral tap in an entire region from said cutting edge to an intermediate position in a width of each of said at least one of said lands, and such that said radial distance is constant in said direction opposite to said direction of rotation of said spiral tap in a region from said intermediate position to said back edge.

7. The spiral tap according to claim 1, wherein at least said chamfered portion and said complete thread portion are covered with a titanium carbonitride TiCN film.

* * * * *